United States Patent [19]

Röhm

[11] 4,302,021
[45] Nov. 24, 1981

[54] NONLOOSENING CHUCK

[76] Inventor: Günter H. Röhm, Heinrich-Röhm-Str. 50, 7927 Sontheim, Fed. Rep. of Germany

[21] Appl. No.: 139,339

[22] Filed: Apr. 11, 1980

[30] Foreign Application Priority Data

Apr. 14, 1979 [DE] Fed. Rep. of Germany ... 7910976[U]

[51] Int. Cl.³ .............................................. B23B 31/10
[52] U.S. Cl. ........................................ 279/60; 279/64
[58] Field of Search ............................ 279/1 C, 60-65

[56] References Cited

U.S. PATENT DOCUMENTS 3,970,323 7/1976 Schnizler ............................. 279/64

Primary Examiner—Robert D. Baldwin
Attorney, Agent, or Firm—Karl F. Ross

[57] ABSTRACT

A chuck has a chuck body formed centered on the chuck axis with an annular array of outwardly directed teeth. A plurality of generally angularly equispaced and radially displaceable jaws on the body can be displaced toward and away from each other by means of a tightening sleeve which is rotatable on the chuck body about the chuck axis. A ratchet pawl is pivoted on this sleeve and has an end engageable with the teeth in a direction so as only to allow rotation of the sleeve and chuck relative to each other in a direction moving the jaws toward each other. A spring is braced between this pawl and the sleeve and urges the sleeve into radial engagement with the teeth. A release ring can be rotated relative to the chuck body between a holding position which allows the spring to press the end of the pawl against the teeth and a releasing position which holds the end of the pawl out of engagement with these teeth.

10 Claims, 2 Drawing Figures

4,302,021

NONLOOSENING CHUCK

FIELD OF THE INVENTION

The present invention relates to a chuck. More particularly this invention concerns a chuck used to hold a drill bit in a hammer drill.

BACKGROUND OF THE INVENTION

A standard drill chuck has a chuck body that is mounted on the spindle or arbor of a drill or other similar machine and that is provided externally with a so-called tightening sleeve. A plurality of angularly equispaced jaws are provided between this sleeve and the chuck body which are provided with formations that can move these jaws radially toward each other or radially apart on relative rotation of the tightening sleeve and the chuck body. Normally the jaws are spring-loaded radially outwardly. They are moved radially inwardly when the tightening sleeve is rotated relative to the chuck body by being pushed forward on an inner frustoconical surface of the tightening sleeve.

In order to prevent such a chuck from loosening it is known to provide a ratchet arrangement that normally only allows the tightening sleeve to rotate in the tightening direction on the chuck body. Such arrangements are described in my copending applications Ser. Nos. 011,772 now abandoned and 011,774, now U.S. Pat. No. 4,213,623 issued July 22, 1980 both filed Feb. 13, 1979. In the latter of these applications a ratchet pawl is pivotal about an axis parallel to the chuck axis on a special holding ring clamped to the chuck body. Teeth are formed on the so-called pressure ring that is threaded to the tightening sleeve and that serves to axially fix the tightening sleeve relative to the chuck body. This pawl has a button projecting radially out of the holding ring through a window formed therein and is not only spring loaded into position with its end engaged in the teeth of the pressure ring, but is also so counterbalanced that radially outwardly effective centrifugal force will increase the radial inward force of its tooth into the teeth of the pressure ring.

Such an arrangement has numerous advantages, however, it represents a relatively bulky and trouble-prone structure. The relatively large pawl requires the entire chuck to be built so that it is quite a bit larger and heavier than would normally be necessary. The hole through which the button of the ratchet pawl engages allows shavings and the like produced during use of the chuck to enter its interior, fouling it and requiring eventual cleaning. Furthermore, this button must be held depressed during the entire loosening operation of the chuck to maintain the end of the pawl out of engagement with the ratchet teeth. Holding in this button with one hand while rotating the tightening sleeve to loosen the chuck with the other does not leave the operator another hand to hold the other tool that is being fitted to or taken out of the chuck.

OBJECTS OF THE INVENTION

It is an object of the present invention to provide an improved chuck.

Another object is to provide a nonloosening chuck of the above-described general type which overcomes the above-given disadvantages of the known chuck.

SUMMARY OF THE INVENTION

These objects are attained according to the instant invention in a chuck of the above-described general type, but wherein the ratchet pawl is carried on the pressure ring that is fixed to the tightening sleeve. A release ring is provided which is angularly displaceable on the chuck between a holding position which allows the tension spring of the ratchet pawl to press the end of the pawl against the teeth and a releasing position holding the end of the pawl out of engagement with these teeth.

The system according to the instant invention is therefore extremely compact and rugged. It does not, in fact, require that the chuck be any larger than a conventional chuck even though it is provided with the advantageous nonloosening ratchet arrangement that prevents the tightening sleeve from rotating in the loosening direction unless the holding ring has been intentionally displaced into the releasing position. The use of such a holding ring also eliminates the need of leaving a hole in the side of the chuck, thereby greatly reducing the service problems normally inherent in the nonloosening type chuck. What is more, the use of a rotary releasing ring means that it is relatively simple to set the arrangement up so that the releasing ring is stable in both the holding and releasing positions. To this end the releasing ring has a skirt formed with a throughgoing window through which the outer arm of the pawl can engage in the holding position. On displacement from the holding to the releasing position the edge of the window engages the outer arm of the pawl and pivots it to disengage it from the ratchet teeth. This window is covered by an annular cap fixed to the chuck body and extending forwardly past most of the release ring.

According to further features of this invention the pressure ring is formed with a radially throughgoing slot that contains the pawl and the pawl is rotatable about a pawl axis passing through the pressure ring at the slot and extending parallel to the chuck axis. The pawl axis is defined by a pivot pin seated at both ends in the pressure ring and having a central or intermediate portion which pivotally carries the pawl. Thus this pawl is extremely rigidly mounted on the pressure ring which in turn is threaded tightly on the tightening sleeve. Normally the thread direction is such that forces effective on the chuck body in the loosening direction are opposite the thread direction so that they tend to tighten the pressure ring on the tightening sleeve.

According to further features of this invention the release ring and tightening sleeve are provided with interengaging structure and abutments for limiting rotation of the releasing ring about the chuck axis to a predetermined arc. This is most easily done simply by forming the releasing ring with a notch having ends constituting the abutments and providing the tightening sleeve with a pin engaged axially through the notch and engageable with these abutments in the end positions of the release ring which correspond to the release and holding positions. Appropriate indicia on the release ring and tightening sleeve allow the user readily to ascertain whether the ratchet mechanism is either in the holding or releasing position.

In accordance with yet another feature of this invention the end of the pawl and the teeth meet generally flatly on a plane tangential to a circle centered on the pivot axis of the pawl. Thus the pawl will be wholly subject to compression and will, therefore, be able to resist extremely large forces.

According to yet another feature of this invention an O-ring or similar annular seal centered on the chuck axis is engaged radially between the release ring and the tightening sleeve. This elastomeric element therefore not only prevents particles and the like from entering the chuck between these two parts, but also inhibits relative rotation of them. Of course it is possible to rotate the two parts relative to each other once the static friction of the ring is overcome, but nonetheless the seal ring will normally prevent the two parts from rotating relative to each other so that they can be set in a position and can be counted on to stay in this position.

SPECIFIC DESCRIPTION

Figure 1:
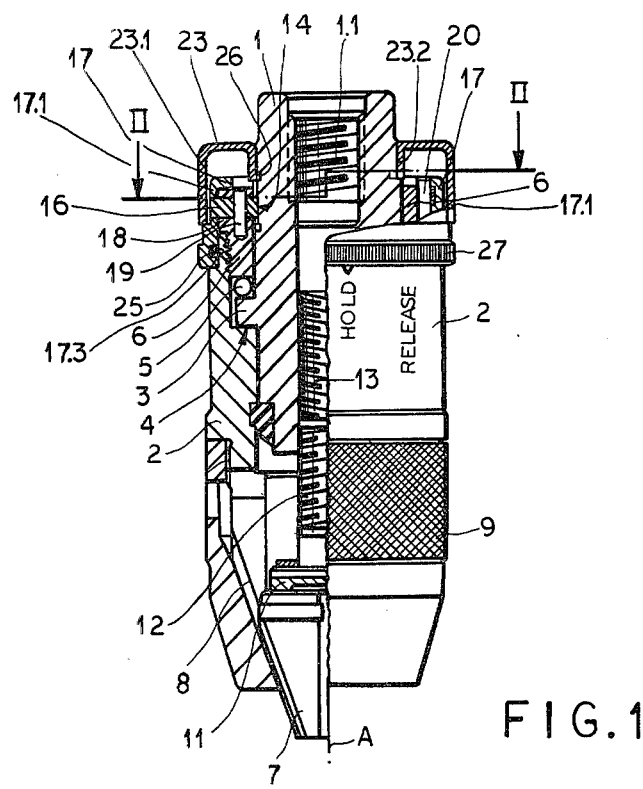
FIG. 1 is a side view partly in axial section of the chuck according to this invention.
Figure 2:
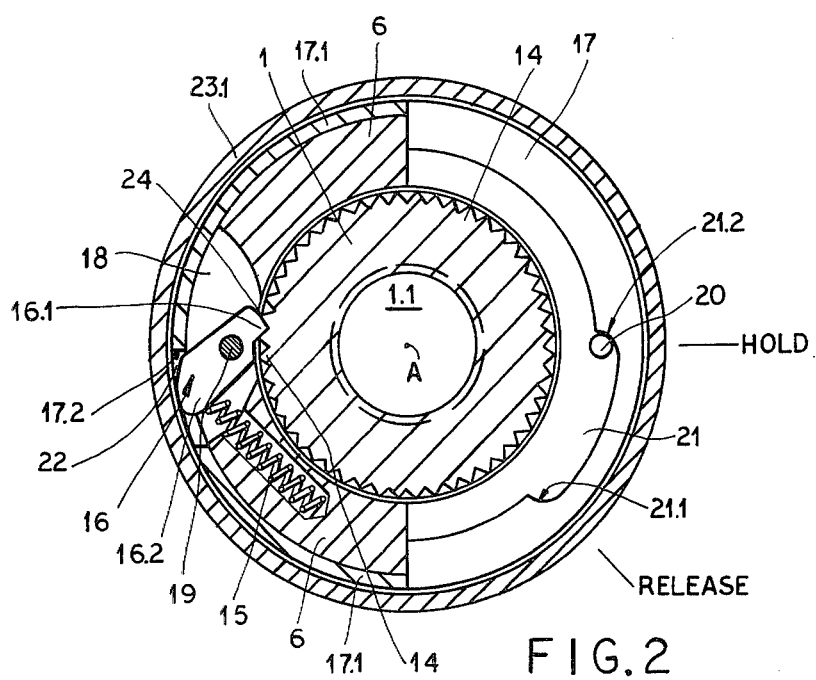
FIG. 2 is a large-scale section taken along line II—II of FIG. 1.

As seen in FIGS. 1 and 2 a chuck according to the instant invention has a chuck body 1 centered on an axis A and formed at one end with a threaded bore 1.1 which is normally screwed onto the threaded spindle of a drill. Surrounding this body 1 is a tightening sleeve 2 also centered on the axis A and having a milled portion 9 which is held by the user during relative rotation of the parts 1 and 2 about the axis A. A radially outwardly projecting square-section ridge 3 formed unitarily with chuck body 1 has a front face resting on a shoulder 4 of the sleeve 2 and a rear face engaging an array of balls 5 riding on a so-called pressure ring 6 threaded into the rear end of the sleeve 2.

Three jaws 7 are axially displaceable at the front end of the sleeve 2 in converging guides 8 and are engaged at their rear ends by a pusher 11 carried on a threaded spindle 12 engaged in a threaded portion 13 of the bore 1.1. Neither the jaws 7 nor the threaded spindle 12 can rotate relative to the tightening sleeve 2. Thus rotation of the chuck body 1 relative to the sleeve 2 in one direction will screw the spindle 12 in one direction in the threaded bore 13 and rotation in the opposite direction will screw it in the opposite direction. This spindle 12 will therefore displace the jaws 7 by means of the pusher end 11 in the manner well known in the art. Normally a spring is provided to urge the jaws 7 radially apart so that as the spindle 12 and pusher 11 retract axially, upwardly in FIG. 1, the jaws 7 similarly pull radially apart and move backwardly inside the chuck.

Adjacent its rear end the chuck body 1 is formed with an array of teeth 14 of simple triangular shape. A ratchet pawl 16 has an inner arm 16.1 engageable between these teeth 14 and an outer arm 16.2 against which is braced a compression spring 15 received in a tangential blind bore formed in the pressure ring 6. The pressure ring 6 itself is formed with a radially throughgoing cutout 18 in which the ratchet pawl 16 is received and which is bridged by a pivot pin 19. Thus the pawl 16 is angularly fixed extremely solidly inside the pressure ring 6 which itself is tightly threaded to the tightening sleeve 2. In addition the end of the inner arm 16.1 lies in a plane 24 which is tangential to a circle centered on the pivot pin 19 and which is also the plane of the rear flank of the tooth 14 it is flatly engaging. In this manner when the chuck body 1 attempts to rotate counterclockwise, as seen in FIG. 2, relative to the pressure ring 6, the inner arm 16.1 will be subject merely to compression so it will be able to resist such counterclockwise rotation in the loosening direction with considerable force.

A release ring 17 coaxially surrounding the upper portion of the pressure ring 6 and also rotatable on the tightening sleeve 2 about the axis A has a downwardly extending skirt or rim 17.1 formed with a radially throughgoing cutout or window 22 having an edge 17.2 engageable with the outer arm 16.2 of the pawl 16. The upper portion of this release ring 17 is formed with a radially inwardly open notch 21 having a pair of ends 21.1 and 21.2. A pin 20 fixed in the pressure ring 6 extends upwardly into this notch 21 and abuts the ends 21.2 and 21.2 in the release and hold positions, respectively, as will be described below.

Finally a sheet-metal U-section ring or cap 23 has an outer lip 23.1 extending down around the ring 17 past the cutout or window 22 to immediately above a milled region 27 of the ring 17. This ring 23 also has an inner lip or periphery 23.2 pressure-fitted into a groove 26 of the chuck body 1, so that it is rotationally locked to this chuck body 1. The outer lip 23.1 of the cap 23 may similarly fit in a groove of the ring 17. This element 23 therefore protects the ratchet structure. In addition on its inside the release ring 17 is formed on its lower edge level with the milled region 27 with a groove 17.3. The groove 17.3 receives an O-ring 25 that bears frictionally against the tightening sleeve 2.

In the position illustrated in FIG. 2 with the end 16.1 of the ratchet pawl 16 engaged between two teeth 14 it is only possible for the chuck body 1 and the tightening sleeve 2 to rotate relative to each other in a direction tightening the chuck, that is moving the jaws 7 regularly radially toward one another. Rotation in the opposite direction is countered by flat engagement of the end of the arm 16.1 against the teeth 14.

In order to loosen the chuck the user grips the milled portion 27 of the release ring 17 and rotates this release ring 17 through an arc of approximately 45° so that the pin 20 moves from the abutment edge 21.2 to the abutment edge 21.1. This action will bring the abutment edge 17.2 of the ring 17 into engagement with the outer arm 16.2 of the pawl 16 and will cam it out of engagement with the teeth 14. The seal 25 between the ring 17 and tightening sleeve 2 creates enough friction that these two parts will hold in either end position.

The structure according to the instant invention is extremely rugged. It will prevent loosening of the chuck even under most adverse circumstances, as in a hammer drill. What is more the open window 22 of the release ring 17 is completely covered by the outer periphery 23.1 of the ring 23 so that no dirt or the like can enter the chuck at this point.

I claim:
1. A chuck comprising:
   a chuck body defining a chuck axis and formed centered on said axis with an annular array of outwardly directed teeth;
   a plurality of generally angularly equispaced and radially displaceable jaws on said body;
   a tightening sleeve rotatable on said chuck body about said axis;
   means including formations on said jaws, on said body, and on said sleeve for displacing said jaws radially inwardly on rotation of said tightening sleeve about said axis in a tightening direction on said body and for permitting radial outward dis- placement of said jaws on rotation of said sleeve on said body in an opposite loosening direction;

a ratchet pawl pivoted about a pawl axis generally parallel to said chuck axis and fixed on said sleeve, said pawl having an end engageable with said teeth, said teeth and pawl being so constructed as to permit rotation of said tightening sleeve on said body in said tightening direction when said end is engaged with said teeth and to prevent rotation in said loosening direction when said end is engaged with said teeth;

a spring braced between said pawl and said sleeve urging said end of said pawl into radial engagement with said teeth; and means including a release ring rotatable relative to said chuck body between a holding position allowing said spring to press said end of said pawl against said teeth and a releasing position holding said end of said pawl out of engagement with said teeth.

2. The chuck defined in claim 1 wherein said sleeve includes a sleeve member surrounding said chuck body and a pressure ring threaded inside said sleeve member and carrying said pawl.

3. The chuck defined in claim 2 wherein said pressure ring is formed with a radially throughgoing slot containing said pawl and said pawl axis passes through said pressure ring at said slot parallel to said chuck axis.

4. The chuck defined in claim 3 wherein said pressure ring includes a pivot pin at said pawl axis and having a pair of ends seated at opposite axial sides of said slot in said pressure ring and an intermediate portion pivotally carrying said pawl.

5. The chuck defined in claim 3 wherein said releasing ring and said tightening sleeve are provided with means including interengaging structure and abutments for limiting rotation of said releasing ring about said chuck axis to a predetermined arc.

6. The chuck defined in claim 5 wherein said releasing ring is formed with a notch having ends constituting said abutments, said tightening sleeve having a pin engaged axially through said notch and constituting the respective structure.

7. The chuck defined in claim 3 wherein said releasing ring is formed with a window alignable with said pawl and having an edge, said pawl having another end engageable with said edge for camming said pawl out of engagement with said teeth.

8. The chuck defined in claim 3 wherein said end of said pawl and said teeth meet generally flatly at a plane tangential to a circle centered on the pivot axis of said pawl.

9. The chuck defined in claim 3, further comprising means for resisting rotation of said release ring relative to said sleeve.

10. The chuck defined in claim 9 wherein said means for resisting includes an O-ring centered on said chuck axis and engaged radially between said release ring and said sleeve.

* * * * *